United States Patent Office 3,657,291
Patented Apr. 18, 1972

3,657,291
3,11-DIHALO-2,3,7,11-TETRA-ALKYL-4,6-DIENOIC ACID ESTERS
Václav Jarolím, Karel Hejno, Karel Sláma, and František Šorm, Prague, Czechoslovakia, assignors to Československá Akademie Ved, Prague, Czechoslovakia
No Drawing. Filed Sept. 25, 1969, Ser. No. 861,139
Claims priority, application Czechoslovakia, Sept. 30, 1968, 6,793/68
Int. Cl. A01n 9/24; C07c 69/62
U.S. Cl. 260—408    11 Claims

ABSTRACT OF THE DISCLOSURE

Methods employing and compositions comprising novel 3,11-dihalides of esters of 2,7,11-trialkyl-3-alkylene-4,6,10-trienoic acids useful for the control of insects.

---

This invention relates to methods and compositions for the control of insects. More particularly, the present invention relates to methods and compositions for the control of insects and to novel 3,11-dihalides of esters of 2,7,11-trialkyl-3-alkylene-4,6,10-trienoic acids.

A number of substances are known which have juvenile hormone activity demonstrated by stimulation of larval development, inhibition of metamorphosis and stimulation of ovarian growth in adult females. Farnesol, methyl 10,11-epoxyfarnesoate, esters of dihydrochlorofarnesoic acid, juvabione, dehydrojuvabione and derivatives of p-(1,5-dimethylhexyl)benzoic acid may be given as examples.

Compounds, the preparation and application of which is described herein, have a high specific activity for some insects which are considerably resistant to known juvenile hormone active substances. The compounds of the present invention act selectively on certain harmful insects and, moreover, exhibit high sterilizing properties.

The compounds of the present invention are represented by Formula I:

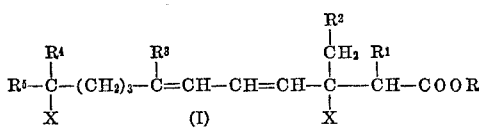

wherein R is lower alkyl, cycloalkyl or aralkyl; each of $R^1$, $R^3$, $R^4$ and $R^5$ is lower alkyl; $R^2$ is hydrogen or lower alkyl of one to five carbon atoms; and X is bromo, chloro or fluoro.

The term "lower alkyl," as used herein, refers to a straight or branched chain saturated aliphatic hydrocarbon group having a chain length of one to six carbon atoms, such as methyl, ethyl, propyl, i-propyl, t-butyl, pentyl and hexyl. The term "cycloalkyl," as used herein, refers to a cycloalkyl group having four to eight carbon atoms, such as cyclobutyl, cyclopentyl and cyclohexyl. The term "aralkyl," as used herein, refers to an aralkyl group having seven to twelve carbon atoms, such as benzyl, phenylethyl and naphthylmethyl.

The compounds of Formula I are prepared by a process outlined as follows, wherein R, $R^1$, $R^2$, $R^3$, $R^4$ and $R^5$ have the same meaning as given above.

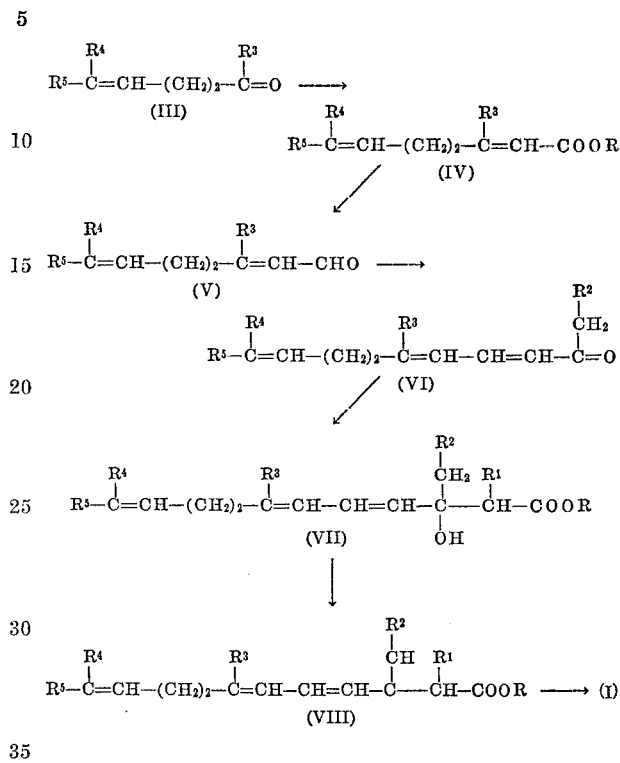

In the practice of the above procedure, a ketone of Formula III is reacted with a dialkyl carbalkoxymethylphosphonate, such as dialkyl carbomethoxymethylphosphonate, in the presence of base, such as an alkali metal hydride or alkoxide, to yield the ester (IV). The ester of Formula IV is reduced as with lithium aluminum hydride, or the like, to the corresponding alcohol which is oxidized using manganese dioxide, Jones reagent, chromium trioxide, or the like, to yield the aldehyde (V). The aldehyde of Formula V is reacted with a ketone of the formula $CH_3$—CO—$R^1$ in the presence of base, such as sodium hydroxide in an organic solvent (Aldol), to yield the tri-unsaturated ketone (VI).

The ketone of Formula VI is reacted with esters of α-halo carboxylic acids of the following formula:

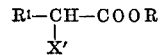

wherein R and $R^1$ are as defined above and X' is bromo or chloro, in the presence of zinc in an organic solvent inert to the reaction to yield the hydroxy ester (VII) which is dehydrated using, for example, phosphorus oxychloride in pyridine to yield the ester (VIII).

The dihydrohalides of Formula I are prepared by treating the unsaturated ester (VIII) with a hydrogen halide (HX in which X is bromo, chloro or fluoro) in an organic solvent, preferably an alcohol, such as methanol, ethanol or the alcohol corresponding to the ester moiety.

Alternatively, the compounds of Formula I can be prepared from the free acid of VIII obtained by hydrolyzing the ester (VIII) with base, such as sodium hydroxide or potassium hydroxide in alcohol and treating the free acid with hydrogen halide to obtain the dihydrohalide which is then esterified directly with an alcohol or diazoalkaneor via the acid halide, such as the acid chloride or acid bromide.

The compounds of Formula I are useful for the control of insects as an isomeric mixture or as individual isomers. The isomers can be separated by gas chromatography or fractional distillation.

In accordance with the present invention, there is provided a method for the control of insects which comprises contacting the insects with a compound selected from those of Formula I above in an amount effective to inhibit the metamorphosis of said insects. To aid in achieving a uniform distribution or application, it is advantageous to employ a composition comprising an inert carrier and, as the essential active ingredient, a compound of Formula I. One method for the control of insects in accordance with the present invention is to apply the composition comprising an inert carrier and a compound of Formula I to the locus of insect infestation, such as to the plant life on which the insects live. These compositions can be either solid or liquid. Solid compositions for treating insects can be prepared by incorporating the active compound with an inert carrier, such as finely divided talc, silica, pyrophyllite or clay or granular inert carriers, such as the vermiculites. Liquid compositions can be prepared by mixing the active compound with inert carriers, such as acetone, xylene, peanut oil, cottonseed oil, sesame oil and other vegetable oils and mineral oils conventionally employed as carriers in insecticidal formulations for application by spraying. Emulsions containing the active ingredient can also be used. Other ingredients can be present in the compositions of the present invention to aid in the effective application of the active ingredient, such as wetting agents, dispersing agents, insect attractants, and the like. The concentration of active ingredient of a compound of Formula I in the composition can vary greatly and will depend on a variety of factors, such as the specific insect involved, degree of insect infestation, locus of insect infestation, environmental and weather conditions and type of application device used. Generally, the composition will contain less than 95% by weight of the active ingredient and more frequently less than 10% by weight. The compounds of Formula I are useful insect control agents by virtue of their ability to inhibit the metamorphosis of the insect. The expression "to inhibit the metamorphosis of said insect," as used herein, and in the appended claims, is used to describe the direct insecticidal effect of the compounds of Formula I as well as the indirect insecticidal effect of said compounds. In some cases, the compounds have a direct insecticidal effect in that the insect dies upon contact with a compound of Formula I, particularly when the compound is applied at the egg stage and larvae stage of the insect's life. In other words, the compounds of the present invention have an indirect insecticidal effect in that upon contact with a compound of Formula I during the egg stage, larvae stage or pupa stage, the insect is unable to pass from one metamorphic stage to the next in a normal manner and eventually dies without reproducing.

The following examples are presented to illustrate the present invention.

EXAMPLE 1

To 11.2 g. of diethyl carbomethoxymethylphosphonate in 100 ml. of diglyme is added 2.4 g. of sodium hydride. The mixture is stirred until the evolution of gas ceases and 6.5 g. of 7-methylnon-6-en-3-one is slowly added with stirring, maintaining a temperature below 30° C. The mixture is stirred for about one hour at room temperature and then diluted with water and extracted with ether. The ether extracts are washed well with water, dried over sodium sulfate and evaportaed to remove solvent to yield methyl 3-ethyl-7-methylnona-2,6-dienoate.

By using 6-methylhept-5-en-2-one and 6-methyloct-5-en-2-one in the above procedure in place of 7-methylnon-6-en-3-one, there is obtained methyl 3,7-dimethylocta-2,6-dienoate and methyl 3,7-dimethylnona-2,6-dienoate, respectively.

EXAMPLE 2

One gram of methyl 3-ethyl-7-methylnona-2,6-dienoate in 30 ml. of anhydrous ether is added slowly to a stirred suspension of one g. of lithium aluminum hydride in 30 ml. of anhydrous ether at 0° C. under nitrogen. The mixture is stirred for about eight hours and then treated with acetic acid and filtered. The filter is washed with ether and the washings and filtrate combined, separated and the ether phase dried over sodium sulfate. The ether phase is evaporated to yield 3-ethyl-7-methylnona-2,6-diene-1-ol.

Similarly, each of methyl 3,7-dimethylocta-2,6-dienoate and methyl 3,7-dimethylnona-2,6-dienoate is reduced to 3,7-dimethylocta-2,6-diene-1-ol and 3,7-dimethylnona-2,6-dien-1-ol, respectively.

EXAMPLE 3

A mixture of 5.6 g. of 3-ethyl-7-methylnona-2,6-dien-1-ol, 200 ml. of petroleum ether (B.P. 40–50° C.) and 50 g. of manganese dioxide is stirred for about 24 hours (progress of reaction is followed by thin layer chromatography). The mixture is filtered and the filter washed with petroleum ether. Combined filtrate and washings is washed with water, dried over magnesium sulfate and evaporated to yield 3-ethyl-7-methylnona-2,6-dien-1-al.

3,7-dimethylocta-2,6-dien-1-al and 3,7-dimethylnona-2,6-dien-1-al are similarly prepared from the corresponding C-1 alcohol.

EXAMPLE 4

A mixture of 2.3 g. of 3-ethyl-7-methylnona-2,6-dien-1-al, 2 g. of acetone, 40 ml. of water, 70 ml. of ethanol and 0.3 g. of sodium hydroxide is stirred efficiently for 24 hours. Then 2 g. of acetone is added and stirring continued overnight. The mixture is diluted with water, shaken with ether (3× 50 ml.), separated and extracts combined. The combined extracts are washed well with water, dried and evaporated to yield 6-ethyl-10-methyldodeca-3,5,9-trien-2-one which can be purified by distillation or gas-liquid chromatography.

By using methyl ethyl ketone in place of acetone in the foregoing procedure, there is obtained 7-ethyl-11-methyltrideca-4,6,10-trien-3-one.

By using each of 3,7-dimethylocta-2,6-dien-1-al and 3,7-dimethylnona-2,6-dien-1-al in place of 3-ethyl-7-methylnona-2,6-dien-1-al in the above procedure, there is obtained 6,10 - dimethylundeca-3,5,9-trien-2-one (pseudoionone) and 6,10-dimethyldodeca-3,5,9-trien-2-one.

EXAMPLE 5

A solution is prepared of 19.2 g. of 6,10-dimethylundeca-3,5,9-trien-2-one, 18.4 g. of methyl α-bromopropionate and 80 ml. of absolute benzene. One fifth of this solution is added to crude zinc powder (7.2 g.) in a three-necked flask equipped with mechanical stirrer, dropping funnel and reflux condenser. The reaction mixture is gently heated and when the reaction starts, the remaining solution is added slowly. The whole mixture is then refluxed for one hour, cooled, poured onto ice, acidified with dilute sulfuric acid and extracted with ether. The ethereal extract is washed with water, dried and evaporated to give the hydroxy methyl ester (VII; $R^2$ is hydrogen, each of R, $R^1$, $R^3$, $R^4$ and $R^5$ is methyl). The hydroxy ester is added dropwise at room temperature (about 20 minutes) to a stirred mixture of phosphorus oxychloride (11 ml.), absolute pyridine (57 ml.) and absolute benzene (120 ml.). The mixture is then heated at 100° C. for one hour, poured onto ice, acidified with dilute sulfuric acid and extracted with ether. The ethereal layer is separated, washed with water, and then dried and evaporated to yield methyl 2,7,11-trimethyl-3-methylenedodeca-4,6-10-trienoate which can be purified by chromatography or fractional distillation.

By using each of ethyl α-bromoacetate benzyl α-bromopropionate in place of methyl α-bromopropionate, there is obtained ethyl 2,7,11-trimethyl-3-methylenedodeca-4,6,10-trienoate and benzyl 2,7,11-trimethyl-3-methylenedodeca-4,6,10-trienoate.

The procedure of this example is repeated using each of 6,10-dimethyldodeca-3,5,9-trien-2-one and 6-ethyl-10-methyldodeca-3,5,9-trien-2-one in place of 6,10-dimethylundeca-3,5,9-trien-2-one to yield methyl 2,7,11-trimethyl-3-methylenetrideca-4,6,10-trienoate and methyl 2,11-dimethyl-7-ethyl-3-methylenetrideca-4,6,10-trienoate.

EXAMPLE 6

A solution of methyl 2,7,11-trimethyl-3-methylene-dodeca-4,6,10-trienoate (200 mg.) in absolute methanol (3 ml.) is saturated under cooling with dry gaseous hydrogen chloride. When the saturation is complete, the methanol and hydrogen chloride are removed at room temperature by distillation under reduced pressure. The last traces of hydrogen chloride are removed by co-evaporation of the residue with methanol to yield methyl-3,11-dichloro-2,3,7,11-tetramethyldodeca-4,6-dienoate almost quantitatively. Hydrogenation of the product over palladium on active carbon catalyst affords methyl 2,3,7,11-tetramethyldodecanoate.

By repeating the above procedure using hydrogen bromide, methyl 3,11-dibromo-2,3,7,11-tetramethyldodeca-4,6-dienoate is obtained.

Dihydrofluoride derivatives are prepared by treating the ester with anhydrous hydrogen fluoride in tetrahydrofuran at about 0° C. or by treating the 3,11-dibromo ester with silver fluoride in acetonitrile at room temperature.

Other esters of Formula VIII, such as ethyl 2,7,11-trimethyl-3-methylenedodeca-4,6,10-trienoate, ethyl 2,7,11-trimethyl-3-methylenetrideca-4,6,10-trienoate and ethyl 2,11-dimethyl-7-ethyl-3-methylenetrideca-4,6,10-trienoate are similarly converted into the corresponding 3,11-dihydrohalide such as ethyl 3,11-dichloro-2,3,7,11-tetramethyldodeca-4,6-dienoate, ethyl 3,11-dichloro-2,3,7,11-tetramethyltrideca4,6-dienoate and ethyl 3,11-dichloro-2,3,11-trimethyl-7-ethyltrideca-4,6-dienoate.

TESTING OF THE JUVENILE HORMONE ACTIVITY

Two types of tests were used to determine the juvenile hormone activity of esters according to the present invention.

(a) In the topical assay, test substances were applied to abdominal tergites of freshly moulted larvae of the last instar of Hemiptera as acetone solutions of 1 µl. drops per specimen (the acetone solutions were diluted 1:10, 1:100, 1:1000, etc.).

(b) In the injection assay, test substances were injected in 1 µl. olive oil into the body cavity in dilutions analogous to those in the topical assay. The injection assay was used in combination with the topical assay, especially with freshly moulted pupae of Coleoptera and Lipidoptera.

The juvenile hormone activity was evaluated from the degree of the morphological inhibition of metamorphosis. With larvae of Exopterygote insect, the application of esters according to the present invention results in formation of giant larvae or the so-called half-larval half-imaginal adultoids. In the case of Endopterygote insect pupae, intermediary forms between pupa and imago or monstrous secondary pupae result.

The juvenile hormone activity of esters according to the present invention is shown in the following table and is expressed in units indicating the amount of the substance in micrograms per specimen which caused formation of half-larval adultoids (with Hemiptera) or half-pupal adultoids (with beetles and butterflies). The range of the juvenile hormone activity varies by one order of magnitude with Hemiptera and by two to three orders of magnitude with beetles. Thus, e.g. when the activity unit is 0.05 µg. per specimen, the substance will show first signs of activity when applied at approximately 0.01 µg. per specimen, and maximum activity when more than 0.1 µg. per specimen is applied.

Juvenile hormone activity units of test substances according to the present invention on some insect species. Topical application on last instar larvae.

TABLE

| Insect | First sign of activity | Activity unit | Compound |
|---|---|---|---|
| Pyrrhocoris apterus | 1 | 5 | A |
|  | 1 | 5 | B |
|  | 0.5 | 2 | C |
| Dysdercus cingulatus | 0.4 | 1 | A |
|  |  |  | B |
|  | 0.5 | 1 | C |
| Graphosoma italicum | 0.08 | 0.5 | A |
|  | 0.05 | 0.1 | B |
|  | 0.7 | 5 | C |

In the above table, Compound A is methyl 2,7,11-trimethyl-3-methylenedodeca-4,6,10-trienoate, Compound B is ethyl 2,7,11-trimethyl-3-methylenedodeca-4,6,10-trienoate and Compound C is methyl 3,11-dichloro-2,3,7,11-tetramethyldodeca-4,6-dienoate.

The compounds according to the present invention show an exceptional specific activity on the Hemiptera Pentatomidae (Eurygaster, Aelia) which represent very serious grain pests. With some species, the activity unit is below 1 microgram. Furthermore, the compounds of the present invention are inactive in quantities up to 100 micrograms towards beetles and butterflies (Tenebrio, Galleria) and for this reason may be considered a novel type of selective insect control agent with juvenile hormone activity.

What is claimed is:

1. A compound selected from those having the Formula I:

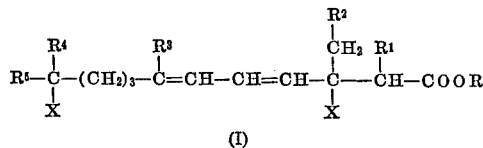

(I)

wherein, R is lower alkyl or benzyl; each of $R^1$, $R^3$, $R^4$ and $R^5$ is lower alkyl; $R^2$ is hydrogen or alkyl of one to five carbon atoms; and X is bromo, chloro or fluoro.

2. A compound according to claim 1 wherein X is bromo or chloro.

3. A compound according to claim 2 wherein $R^1$ is methyl, $R^2$ is hydrogen and each of $R^3$, $R^4$ and $R^5$ is methyl or ethyl.

4. A compound according to claim 3 wherein $R^4$ is methyl and R is methyl or ethyl.

5. A compound according to claim 1 wherein $R^2$ is hydrogen, each of $R^1$ and $R^4$ is methyl and each of $R^3$ and $R^5$ is methyl or ethyl.

6. A compound according to claim 5 wherein X is bromo or chloro.

7. A compound according to claim 6 wherein R is lower alkyl.

8. A compound according to claim 6 wherein X is chloro and R is methyl or ethyl.

9. A compound according to claim 6 wherein R is benzyl.

10. A compound according to claim 1 wherein R is methyl, ethyl or benzyl, $R^1$ is methyl, $R^2$ is hydrogen, each of $R^3$, $R^4$ and $R^5$ is methyl and X is bromo or chloro.

11. A compound according to claim 10 wherein X is chloro.

References Cited

Romaňuk et al.: Proceedings of the National Academy of Science, vol. 57, (2) 349–52 (1967).

LEWIS GOTTS, Primary Examiner

D. G. RIVERS, Assistant Examiner

U.S. Cl. X.R.

260—410.9 R, 593 R, 601 R, 638 R, 410.5; 424—312, DIG. 12